United States Patent [19]

Butcher

[11] 4,292,982
[45] Oct. 6, 1981

[54] LEAF STRIPPER FOR TOBACCO STALKS AND THE LIKE

[76] Inventor: Lawrence D. Butcher, P.O. Box 465, Point Pleasant, W. Va. 25550

[21] Appl. No.: 956,667

[22] Filed: Nov. 1, 1978

Related U.S. Application Data

[63] Continuation-in-part of Ser. No. 846,664, Oct. 28, 1977, abandoned.

[51] Int. Cl.³ .............................................. A01D 1/00
[52] U.S. Cl. .................................... 130/30 R; 56/27.5
[58] Field of Search .................. 56/27.5, 104; 171/28; 131/145; 130/30 R

[56] References Cited

U.S. PATENT DOCUMENTS

| | | | |
|---|---|---|---|
| 2,953,209 | 9/1960 | De Marco | 171/28 |
| 3,406,506 | 10/1968 | Shriver et al. | 56/27.5 |
| 3,646,737 | 3/1972 | Grant | 56/106 |
| 3,885,376 | 5/1975 | Johnson | 131/145 |

FOREIGN PATENT DOCUMENTS 519161 12/1974 U.S.S.R. ........................... 130/30 R

*Primary Examiner*—V. Millin
*Attorney, Agent, or Firm*—Shlesinger, Arkwright, Garvey & Dinsmore

[57] ABSTRACT

A leaf stripper for tobacco stalks and the like including cooperating leaf stripping means, means for moving the stripping means to form a nip, and stalk supporting an infeeding means including a rotating support table mounted adjacent the stripping means in the area of the nip with the infeed axes parallel to the axes of the nip, and the method for stripping the leaves from the stalk.

74 Claims, 11 Drawing Figures

LEAF STRIPPER FOR TOBACCO STALKS AND THE LIKE

This invention is a continuation-in-part of Ser. No. 846,664 filed Oct. 28, 1977 now abandoned and relates more specifically to the apparatus and method for removing leaves from tobacco stalks and the like by grasping the leaves and removing from the forwardly moving stalk with a downward action.

HISTORICAL BACKGROUND

Surprisingly little has been done to aid farmers in the mechanized stripping of tobacco from stalk. Even today stripping is done by hand without mechanization. A single laborer can strip about 450 stalks per day. Although there are a number of patented tobacco strippers, for the most part these used cutting knives which wiped the leaves from the stalks of the plant. Any guide rollers that were provided were transverse to the axes of the stalks.

Whitley U.S. Pat. No. 3,892,061 discloses an apparatus for stripping tobacco leaves from the stalks comprising flexible fingers that are loose footed and spring-like to engage the plant stalk and strip the leaves therefrom. This apparatus operates on the stalks standing in the field as a part of a self-propelled or towed harvester. The prior art does not disclose a stripping apparatus in which the stripping rolls and feed path are oriented to provide parallel axes so that the stalk of tobacco is passed parallel to the stripping rolls.

OBJECTS AND SUMMARY

It is therefore an object of this invention to provide a leaf stripping apparatus for tobacco or the like which will reduce labor costs by enabling the worker to handle what was formerly a day's work in an hour.

Yet another object of this invention is to provide a stripping machine which will handle delicate leaves without substantially damaging the same.

Still a further object of this invention is to provide a leaf stripping apparatus which removes the leaves from near the stalk.

Another object of this invention is to provide an apparatus for removing leaves from stalk which is simple to operate and requires only small amounts of power.

A further object of this invention is to provide an apparatus for removing tobacco leaves and the like from stalk which will also cut out the stalk into pieces that can be easily distributed as fertilizer.

Yet a further object of this invention is to provide a machine for removing tobacco leaves which has built in safety features so as to avoid injury to the operator.

Another object of this invention is to provide a method for handling tobacco stalks and removing leaves therefrom which can be adapted for small or large scale operations.

Still a further object of this invention is to provide a machine for removing tobacco leaves or the like from stalk which is compact and easily moved.

A further object of this invention is to provide a machine for removing stalk and the like which permits the feeding of the stalk into the machine from either end preferably from the top end first.

Yet another object of this invention is to provide a machine for removing leaves from stalk which uses a simple source of power to operate all of the component parts.

In summary therefore, this invention is directed to leaf strippers having means for removing the leaves from the stalk without substantial damage to the leaves while at the same time providing means for chopping the stalk into readily usable fertilizer. These and other objects of this invention will be apparent from the following description and claims.

In the accompanying drawings which illustrate by way of example various embodiments of this invention:

DESCRIPTION OF FIGS. 1 THROUGH 5

Figure 1:
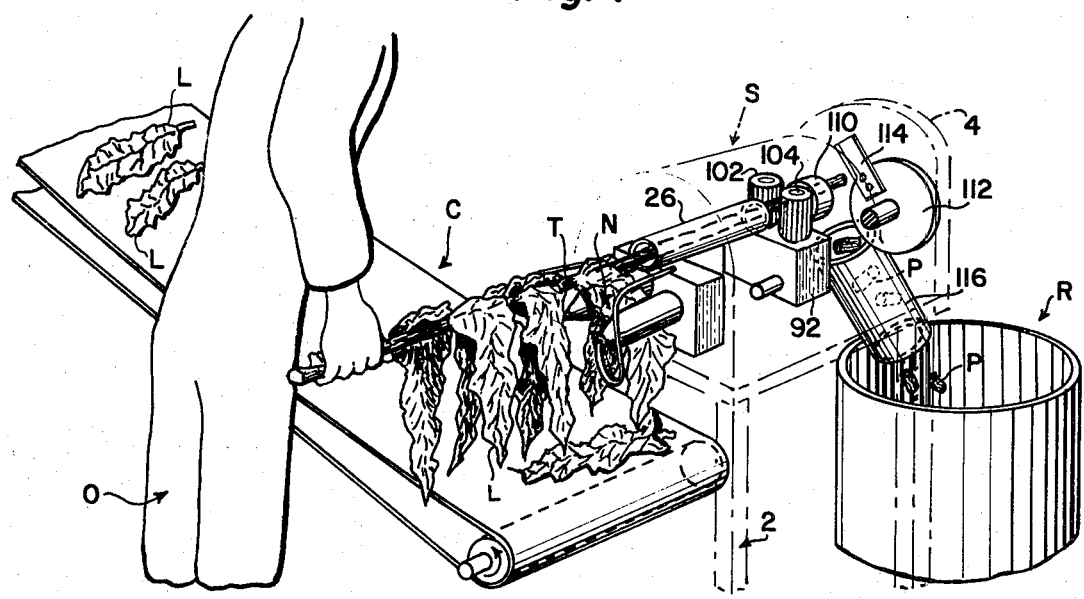
FIG. 1 is a partially diagrammatic perspective of the invention.

The apparatus for leaf stripping comprises in general the main stripping unit S associated with a conveyor C and a receptacle R. A support frame 2 supports the stripping unit S enclosed by a housing 4.

A motor 6 is mounted on the support frame 2 and secured to rails 8. The motor 6 has a drive shaft 10 which powers a pulley member 12.

Figure 6:
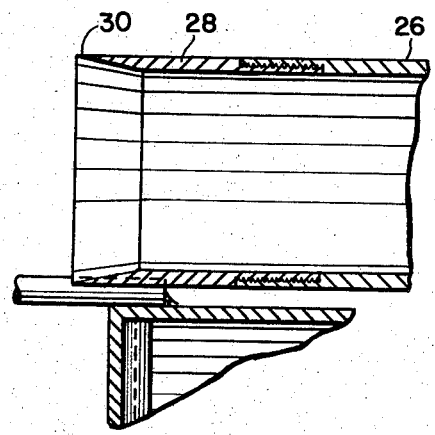
FIG. 6 is a cross sectional view taken along the line 6—6 of FIG. 5 and viewed in the direction of the arrows.
Figure 7:
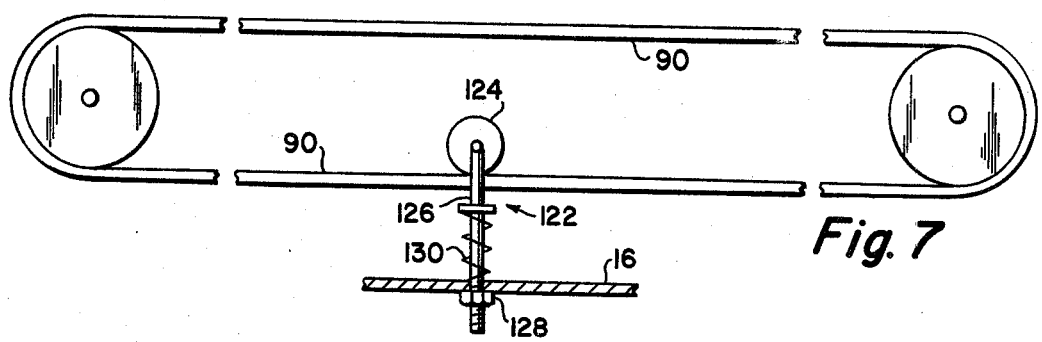
FIG. 7 is a fragmentary side elevational view illustrating a tension device for use with another embodiment of this invention.

Rails 8 are parallel to other support rails 14 and 16 of the support frame 2. The frame 2 includes cross rails 18 connecting the various rails 8, 14 and 16. The frame 2 is provided with support brackets 20, 22 and 24. Brackets 20 and 22 are provided with journals not shown in detail which could have therein bearing sleeves for supporting the rotatable stalk support tube 26. The stalk support tube 26 as shown in cross section in FIG. 6 has a forward end 28 which is threaded onto the main support tube 26. The forward end has a knife edge 30. The forward end 28 may be removed for replacement or sharpening of the knife edge 30. A drive belt 32 rides on a pulley 34 fixed to the stalk support tube 26. The drive belt 32 is driven from the pulley 12.

Figure 3:
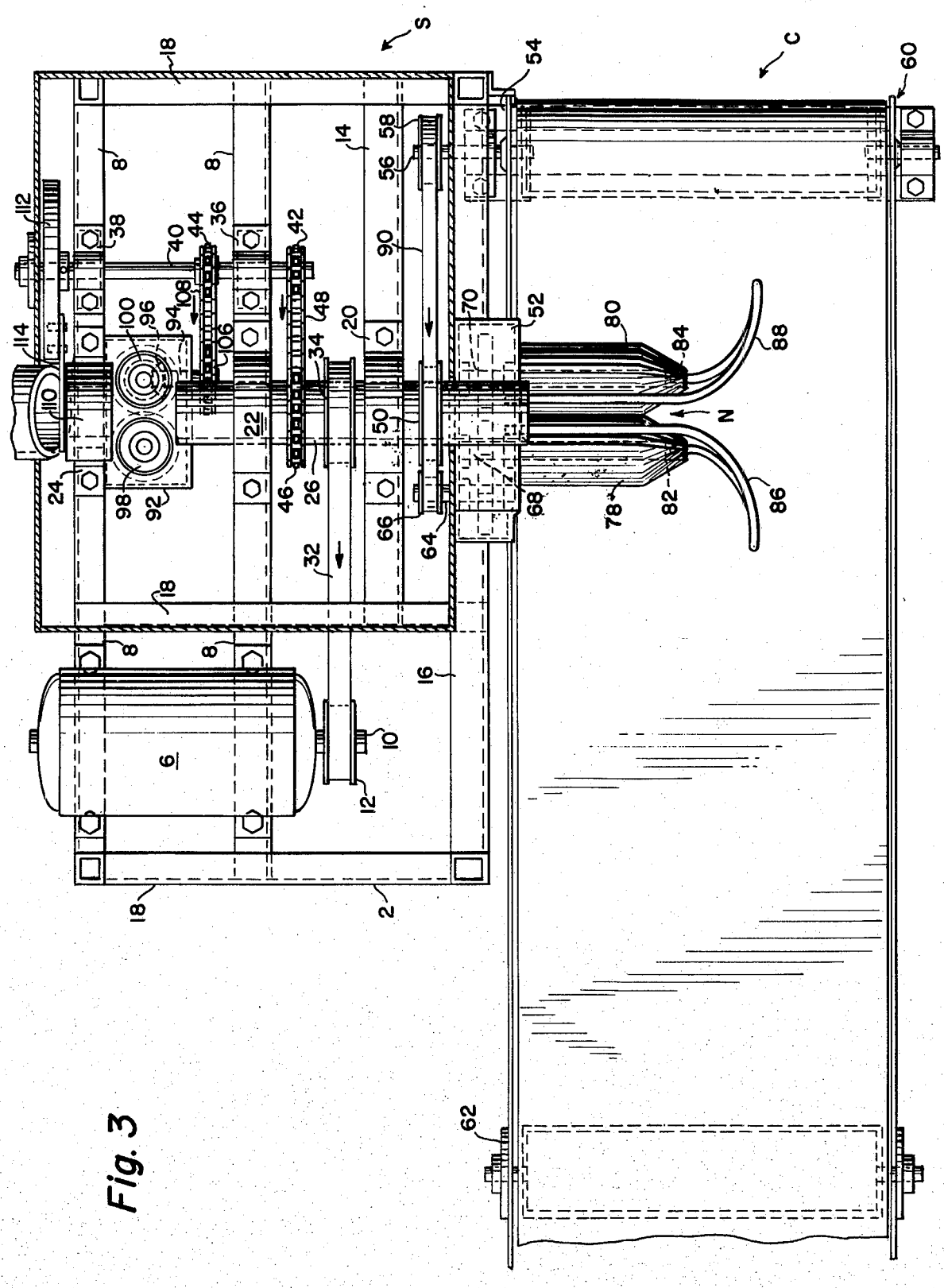
FIG. 3 is a fragmentary top plan view a portion in section viewed along the line 3—3 of FIG. 2 taken along the line 3—3 of FIG. 3 and viewed in the direction of the arrows.

Support journals 36 and 38 are mounted on rails 8 adjacent support brackets 22 and 24 and may include bearing support members (not shown). The support journals 36 and 38 support a rotatable shaft 40 to which a pair of sprockets are splined or otherwise fixed thereto. Mounted on stalk support tube 26 is a sprocket 46. Sprocket 46 drives a sprocket chain 48 which in turn drives sprocket 42 and shaft 40. On the forward portion of the stalk support tube 26 is a pulley 50. Mounted on support rail 16 is a gear case 52 and a journal support 54. Journaled in the support 54 is a stub shaft 56. A pulley 58 is mounted on the stub shaft 56. The other end of the stub shaft is provided with a conveyor belt drive means 60 for driving the conveyor C. Conveyor idlers 62 may be provided as shown in FIG. 3 depending upon the length of the conveyor system.

Figure 2:
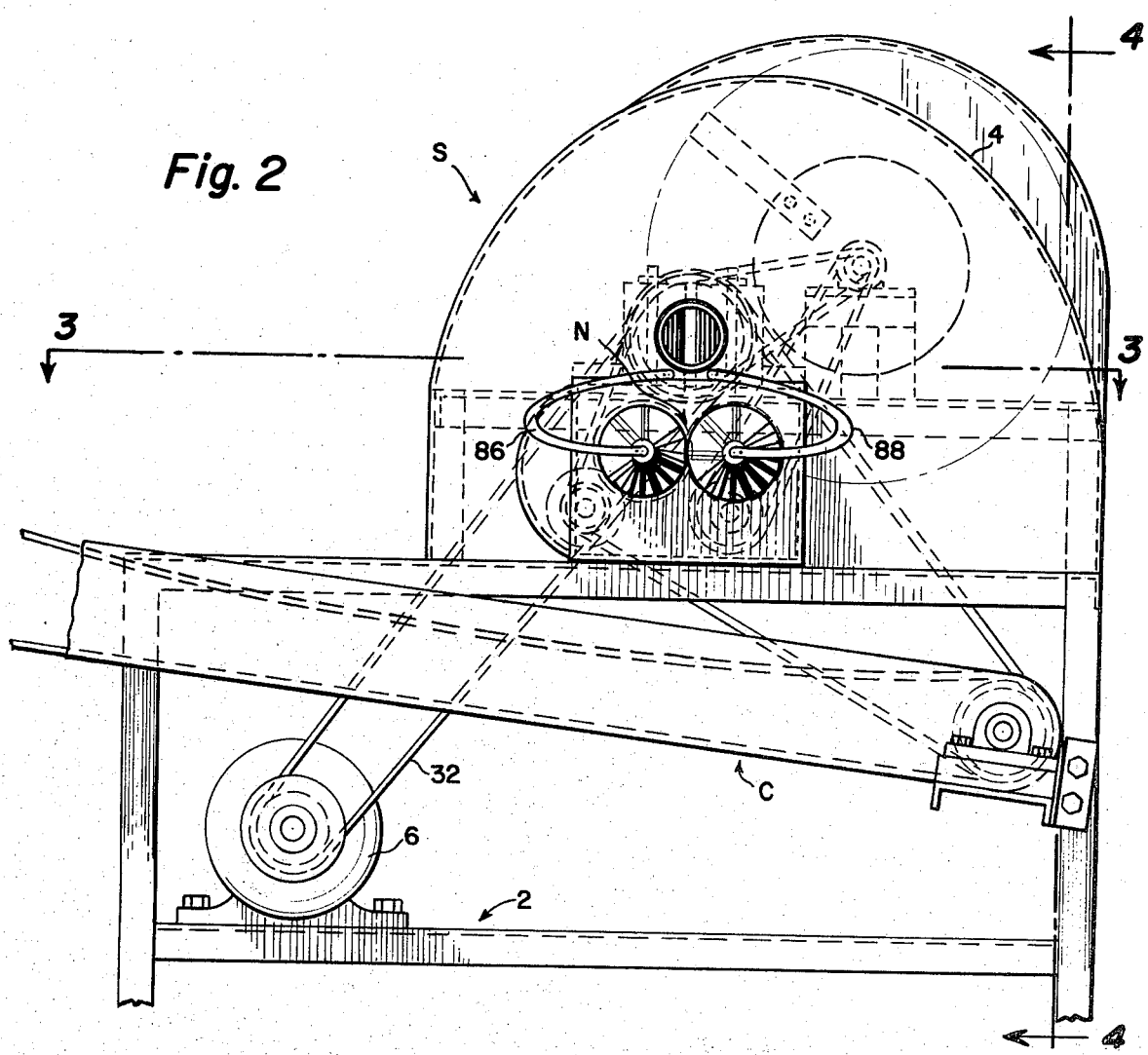
FIG. 2 is a fragmentary front elevation of the invention.
Figure 5:
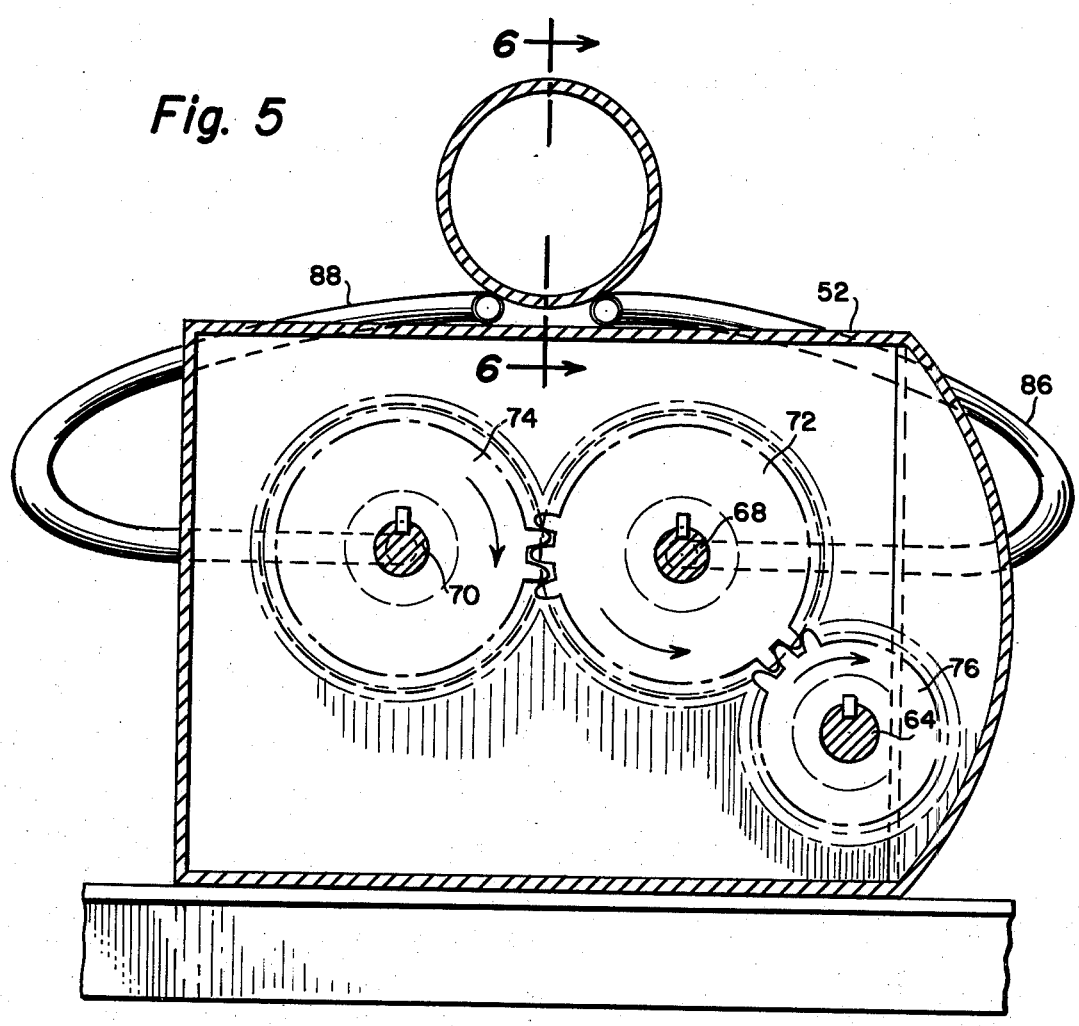
FIG. 5 is a cross sectional view taken along the line 5—5 of FIG. 4 and viewed in the direction of the arrows.

Gear case 52 as best shown in FIG. 5 is provided with a stub shaft 64. On stub shaft 64 is mounted a pulley 66 best shown in FIG. 3. The gear case 52 has a pair of stub axles 68 and 70 on which are splined gears 72 and 74. The stub shaft 64 has mounted thereon a drive gear 76 which engages gear 72 to drive the same which in turn drives gear 74. The stub axle 68 and 70 protrude through the gear case 52 and have mounted thereon a pair of leaf stripping rollers 78 and 80 having conical ends 82 and 84. The rollers rotate towards each other in a downward direction and are in contact with each other and when rotating form a nip N FIG. 2. The rollers should have a friction surface which could include a soft gripping material such as rubber, plastic or the like though for certain uses it may be a hard surface with knurling or the like.

The conical ends 82 and 84 of the rollers 78 and 80 are provided with means for receiving wire guide members 86 and 88. The wire guide members are outwardly flared as noted best in FIG. 3 and have their other ends mounted to the gear case 52 by welding, clamping or the like. Passing over pulleys 50, 58 and 66 is a drive belt 90. Mounted in the housing 4 on one of the rails 8 is a gearbox 92. A stub shaft 94 is mounted for rotation in the gearbox 92 and is provided with a beveled drive gear 96 which drives a pair of meshing gears 98 and 100 as best shown in FIG. 3. The meshing gears 98 and 100 in turn drive a pair of stalk in-feeding grippers 102 and 104. The in-feeding grippers 102 and 104 are shown knurled in FIG. 1 but they can be provided with a series of projecting studs (not shown) having points thereon for purposes hereinafter described. The stub shaft 94 is provided with a sprocket 106. Sprocket drive chain 108 is driven by sprocket 44 to drive sprocket 106. Rearward of the gearbox 92 immediately adjacent the infeed grippers 102 and 104 is a short tubular member 110 approximating the diameter of the stalk support tube 26. The short tubular member 110 is mounted on the support bracket 24.

Figure 4:
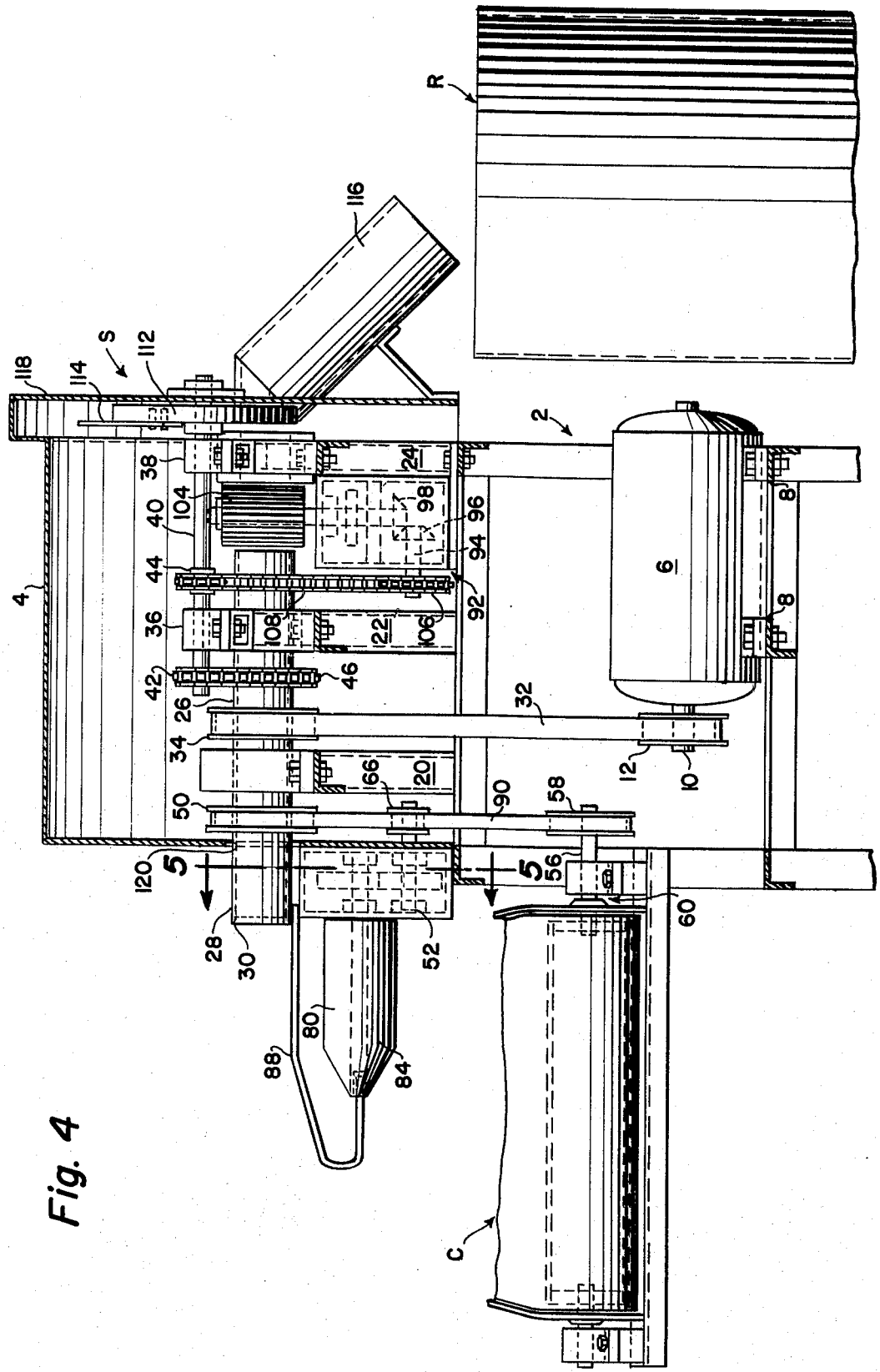
FIG. 4 is a cross sectional view taken along the line 4—4 of FIG. 3 and viewed in the direction of the arrows.

The shaft 40 which is supported on journals 36 and 38 extends beyond the rail 8 and includes a flywheel 112 to which is fixed a chopper cutter 114. The knife edge of the chopper 114 swings by the end of the tubular member 110 as best shown in FIG. 3. Just below the tube 110 and in the area of the chopper 114 is positioned a chute 116 which may be welded or otherwise secured to the housing 4. The housing 4 should include a safety shroud 118 as best shown in FIG. 4. This shroud would be constructed of heavy duty steel to prevent injury should the chopper or flywheel break.

It will be noted that the housing 4 includes a front opening 120 through which the stalk support tube 26 extends. The forward end 28 including the knife edge 30 projects over the gear case 52. It is important that the leaf stripping rollers 78 and 80 not extend too far beyond the knife edge 30. As shown in FIG. 4, the length of the rollers 78 and 80 is about three times the diameter of the stalk support tube 26. It should be further noted that the stalk support tube 26 is positioned above the nip N and above the top surface of the rollers 78 and 80. The distance above the rollers should approximate the diameter of the stalk support tube 26. The rollers 78 and 80 should have a diameter between about two to four inches. The stalk support tube diameter should be sufficiently large to carry the largest stalk with a diameter of about two to four inches with a three inch diameter preferred. The distances and dimensions indicated are preferable for tobacco products and it would be obvious that for other leaf products, other dimensions may be preferred.

FIG. 7

In order to provide a safety factor should the hand or the like be grabbed by the rollers 78 and 80, the belt 90 which drives the rollers 78 and 80 may be provided with a tensioning means 122 including an idler 124 supported on an L-shaped bracket 126 which can be threadedly adjusted by means of a nut 128. A spring member 130 maintains the idler in position. By adjusting the tension on the belt 90, a certain amount of slippage can be allowed so that if the hand should come between the rollers 78 and 80, it will cause the rollers to stop turning while the belt slips on the pulley 66.

FIGS. 8 THROUGH 11

Figure 8:
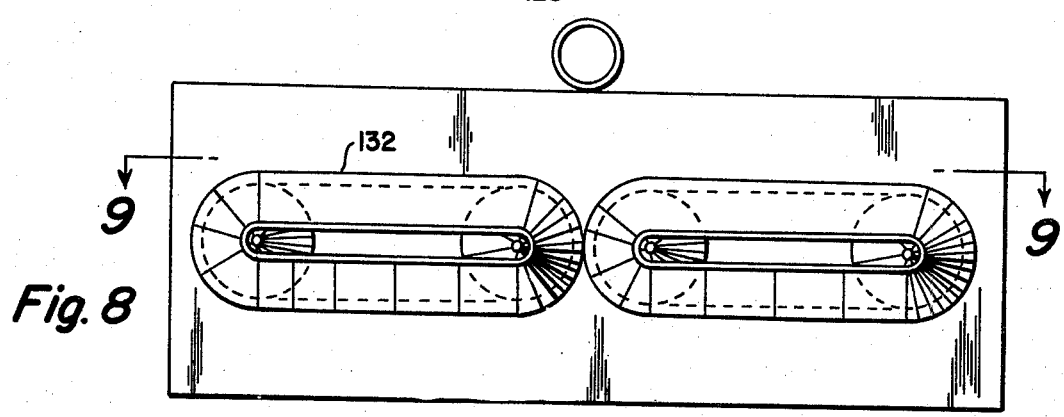
FIG. 8 is a front elevational view of the nip area showing another embodiment of the invention.
Figure 9:
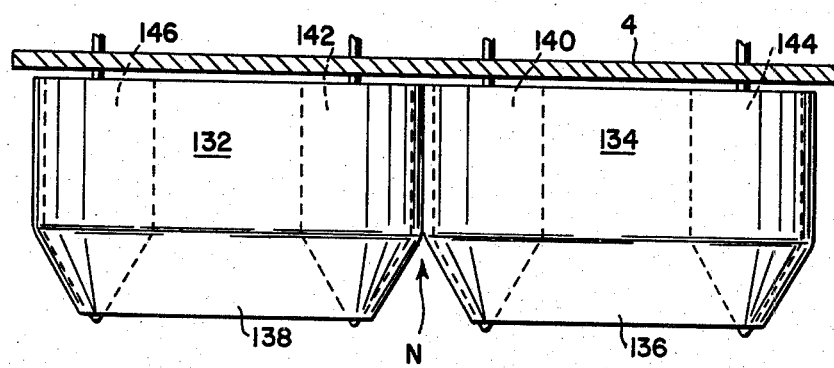
FIG. 9 is a fragmentary cross section view taken along the line 9—9 of FIG. 8 and viewed in the direction of the arrows.

FIGS. 8 and 9 show a modification of the leaf strippers. In this instance the leaf strippers are belts 132 and 134 having turned in portions 136 and 138 so as to present a nip area and is best seen in FIG. 9. The belts can be made of one piece material such as rubber or the like. The belts are mounted on drive rollers 140 and 142 and idler rollers 144 and 146. The drive mechanism is substantially the same as for the single rollers noted in FIG. 2 with the exception that the rollers 144 and 146 are mounted on stub shafts which are journaled in the housing casing 4.

Figure 10:
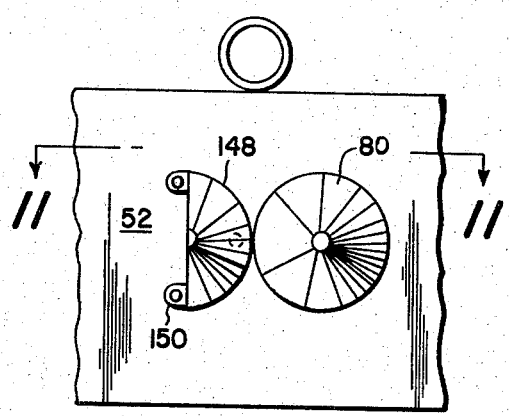
FIG. 10 is a fragmentary front elevational view of the nip area showing another modification of the invention.
Figure 11:
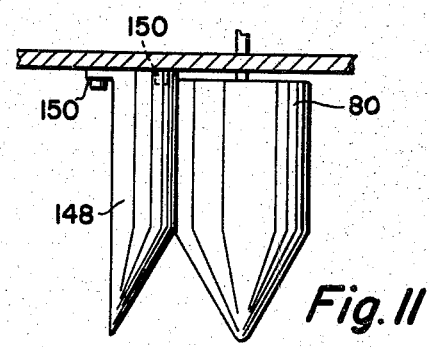
FIG. 11 is a cross sectional view taken along the line 11—11 of FIG. 10 and viewed in the direction of the arrows.

In FIGS. 10 and 11 a single leaf stripping roller 80 is noted. The leaf stripping roller 80 engages a stationary pressure platen 148. The platen 148 is bolted or otherwise secured to the front of the gearbox 52 by means of bolts 150. It is obvious that in place of roller 80, a stripper belt similar to 134 could be used.

OPERATION

Referring now more particularly to FIGS. 3 and 4, when the motor 6 is turned on, belt 32 drives the stalk support tube 26 which in turn drives the conveyor C and the leaf stripping rollers 78 and 80 through the drive pulley 50 and the belt 90. In addition, the sprocket 46 which is mounted on the tube 26 drives shaft 40 through sprocket 42 which in turn powers the gearbox 92 through the sprocket and chain systems 44, 106 and 108 and the gears 96, 98 and 100. Simultaneously with the driving of the in-feeding grippers 102 and 104, the shaft 40 drives the flywheel 112 with the cutter 114. It is now obvious that the rotating stalk support tube 26 powers the rollers 78 and 80, the conveyor C, the in-feed grippers 102 and 104 and the chopper 114. By adjusting the gear train systems in the gearbox 52 and 92, the stalk as shown in FIG. 1 can be made to move into the stalk support tube and into the engagement with the grippers 102 and 104 at a speed sufficiently fast to give the leaf stripping rollers 78 and 80 time to strip the leaves from the stalk as the stalk is being pulled through the tube 26.

If the grippers 102 and 104 are moving too fast as compared to the rollers 78 and 80, the leaves will not be properly stripped and will enter the tube 26 to be chopped by cutter 114 upon emerging from the tubular member 110. In general, for tobacco, the stripping rollers 78 and 80 move at a speed of approximately 350 r.p.m. as compared with the in-feed gripping rollers which move at a speed of approximately 428 r.p.m. The stalk support tube 26 will be rotating at approximately 2 to 2½ times the speed of the stripping rollers. The conveyor itself will be moving at a speed sufficient to prevent the stripped leaves from piling in one spot. This can be adjusted by altering the size of the pulleys 50 and 58.

The speed of the chopper 114 will be set to cut lengths of stalk moving through the machine equal to the axle length of the small tubular 110.

It will now be observed that when the operator O shown in FIG. 1 moves the stalk top end first into the rotating tube 26 the stalk will be supported thereby and upon further in-feed will be picked up and grasped by the in-feed grippers 102 and 104 which will pull the stalk through the tube 26. The spikes or knurling on the grippers or rollers 102 and 104 are necessary for tobacco because in some instances the stalk is hard and a good bite is required to pull the stalk along without slippage. A gap is maintained between the grippers 102 and 104 sufficient to apply pressure to the stalk but it need not flatten the stalk out on passing through. As the stalk is fed into the tube 26, the leaves hang downwardly as shown in FIG. 1 and are guided by the wire guide members 86 and 88 into the nip of the leaf gripping rollers 78 and 80 by means of the conical ends 82 and 84 of the rollers 78 and 80. The rollers 78 and 80 pressing against each other will drag the leaves downward and onto the conveyor C for delivery to a sorting area (not shown). The grippers 102 and 104 will feed the stalk through the tubular member 110 at a speed sufficient to permit the stalk to move forward from the end of the tubular member 110 a distance equal thereto by the time the chopper comes around for another cut. This permits uniformity of pieces falling into the chute 116 and subsequently into the receptacle R.

The chopped pieces of tobacco stalk will be of a size that they can be turned back into the fields as fertilizer and easily worked into the soil. If the pieces are too long, it becomes difficult to work them into the soil for fertilizing purposes. Tobacco stalks have a high nitrogen content and an acre of chopped stalks is equivalent to a ton of manufactured standard granular fertilizer now being used by the farmers and additionally provides organic compost.

It might be mentioned here that in some instances, as a gauge for the leaf stripper, the nip could be of a length substantially equal to the width of the harvested cured leaf being stripped. The stalk support tube 26 is approximately three to six times longer than the length of the tubular member 110.

It should also be noted that the wire guide members 86 and 88 in the area above and adjacent the nip are spaced apart a distance less than the distance between the axes of the leaf stripping rollers 78 and 80.

It should be noted that the top end of the stalk would normally be inserted into the stalk support tube 26 first and this is preferably though it is possible to feed the bottom end of the stalk into the tube 26. Feeding the top end forces the stems of the leaves against the cutting edge 30 of the stalk support tube in a more positive manner as the leaves tend to radiate angularly upwardly from the stalk during the growing season. Such a direction of in-feed affords more positive cut off for this type of plant. It should be further noted that the action of stripping is sequentially beginning from the forward end of the stalk to the rearward end.

While this invention has been described as having a preferred design, it will be understood that it is capable of further modification. This application, is therefore, intended to cover any variations, uses, or adaptations of the invention following the general principles thereof and including such departures from the present disclosure as come within known or customary practice in the art to which this invention pertains, and as may be applied to the essential features hereinbefore set forth and fall within the scope of this invention or the limits of the claims.

Having thus described my invention what I claim is:

1. A leaf stripper for tobacco stalks and the like including:
    (a) generally horizontally disposed cooperating leaf stripping means
    (b) means for moving said stripping means to form a generally horizontal nip
    (c) means for supporting said stalk in a generally horizontal position having a generally horizontal axis
    (d) stalk in-feeding means
    (e) said means for supporting said stalk in a generally horizontal position mounted adjacent said leaf stripping means, and
    (f) the axis of said nip and the horizontal axis of said stalk supporting means fixed in spaced relation relative to each other,
    (g) whereby when said stalk is fed into said stalk supporting and in-feeding means, said leaves are engaged by said nip and angularly stripped from said stalk with respect to the direction of in-feeding.
2. A leaf stripper as in claim 1 and wherein:
    (a) said cooperating leaf stripping means includes at least one roller.
3. A leaf stripper as in claim 1 and wherein:
    (a) said cooperating leaf stripping means includes at least one endless belt.
4. A leaf stripper as in claim 1 and wherein:
    (a) said cooperating leaf stripping means includes a stationary platen.
5. A leaf stripper as in claim 1 and wherein:
    (a) said cooperating leaf stripping means includes a pair of rotating rollers.
6. A leaf stripper as in claim 5 and wherein:
    (a) said pair of rollers include conical ends.
7. A leaf stripper as in claim 5 and including:
    (a) guard means in association with said cooperating leaf stripping means.
8. A leaf stripper as in claim 7 and wherein:
    (a) said guard means includes a pair of cooperating leaf guide members.
9. A leaf stripper as in claim 8 and wherein:
    (a) one of said pair of leaf guide member engages the end of one of said rotating rollers and the other of said pair of leaf guide members engages the end of the other of said rotating rollers.
10. A leaf stripper as in claim 9 and wherein:
    (a) said leaf guide members are wire and flare outwardly of each other and extend between said rollers and said stalk supporting and in-feed means.

11. A leaf stripper as in claim 10 and wherein:
(a) said leaf guide members engage said conical ends.
12. A leaf stripper as in claim 10 and including:
(a) means for mounting said wire leaf guide members and said leaf stripping means.
13. A leaf stripper as in claim 12 and wherein:
(a) said wire leaf guide members in the area of said mounting means are adjacent said nip and spaced apart a distance less than the distance between said roller axes.
14. A leaf stripper as in claim 1 and wherein:
(a) said cooperating leaf stripping means includes a pair of endless belts.
15. A leaf stripper as in claim 1 and wherein:
(a) said nip is of a length at least substantially equal to the width of said leaf being stripped.
16. A leaf stripper as in claim 1 and wherein:
(a) said stalk supporting and in-feeding means is positioned above and clear of said cooperating leaf stripping means.
17. A leaf stripper as in claim 16 and wherein:
(a) said positioning of said stalk supporting and in-feeding means above and clear of said cooperating leaf stripping means is a distance about the width of said stalk supporting and in-feeding means.
18. A leaf stripper as in claim 1 and including:
(a) guard means in association with said cooperating leaf stripping means.
19. A leaf stripper as in claim 18 and wherein:
(a) said guard means includes a pair of cooperating leaf guide members.
20. A leaf stripper as in claim 1 and wherein:
(a) said means for moving said stripping means includes a single motor drive.
21. A leaf stripper as in claim 1 and including:
(a) said means for moving said stripping means includes overload safety means.
22. A leaf stripper as in claim 21 and wherein:
(a) said overload safety means includes a drive belt for said leaf stripping means, and
(b) means for permitting said drive belt to slip upon overload conditions.
23. A leaf stripper as in claim 22 and wherein:
(a) said means for permitting said drive belt to slip includes belt tensioning means.
24. A leaf stripper for tobacco stalks and the like including:
(a) cooperating leaf stripping means
(b) means for moving said stripping means to form a nip
(c) means for supporting said stalk in a generally horizontal position mounted adjacent said stripping means in the area of said nip, and having its stalk supporting axis generally parallel to the axis of said nip
(d) stalk in-feeding means, and
(e) said stalk supporting means including a stalk receiving tube
(f) whereby when said stalk is fed into said stalk receiving tube, said leaves are engaged by said nip and angularly stripped from said stalk with respect to the direction of in-feeding.
25. A leaf stripper as in claim 1 and wherein:
(a) said stalk receiving tube is rotatable.
26. A leaf stripper as in claim 25 and wherein:
(a) said stalk receiving tube includes a front cutting edge for cutting said leaves from said stalk when said stalk is inserted therein.
27. A leaf stripper as in claim 26 wherein:
(a) said front cutting edge is removable.
28. A leaf stripper as in claim 26 and wherein:
(a) said stalk in-feeding means includes stalk grabbing means.
29. A leaf stripper as in claim 28 and wherein:
(a) said stalk grabbing means includes a pair of cooperating in-feed rollers and drive means therefor.
30. A leaf stripper as in claim 29 and wherein:
(a) said rotatable stalk receiving tube includes drive means therefor.
31. A leaf stripper as in claim 30 and including:
(a) means for chopping said stalk.
32. A leaf stripper as in claim 31 and including:
(a) an intermediate stalk support means in advance of said chopper means.
33. A leaf stripper as in claim 32 and wherein:
(a) said intermediate stalk support means is a tubular member.
34. A leaf stripper as in claim 32 and wherein:
(a) said stalk support means is about from 3 to 6 times longer than said intermediate stalk support means.
35. A leaf stripper as in claim 32 and including:
(a) power means for said chopper, and
(b) means associated with said power means to chop said stalk into pieces that approximate the length of said intermediate stalk support means.
36. A leaf stripper as in claim 31 and wherein:
(a) said chopping means includes a rotary knife member.
37. A leaf stripper as in claim 36 and including:
(a) a housing shield for said rotary knife member.
38. A leaf stripper as in claim 36 and wherein:
(a) said rotary knife member is serially positioned rearwardly of intermediate stalk support means.
39. A leaf stripper as in claim 38 and including:
(a) a chopped stalk delivery chute beneath said rotary knife member, and
(b) means for collecting said chopped stalk.
40. A leaf stripper as in claim 29 and wherein:
(a) said cooperating in-feed rollers included surface projections on the outside surface thereof.
41. A leaf stripper as in claim 40 and wherein:
(a) said surface projections are spike-like.
42. A leaf stripper as in claim 24 and wherein:
(a) said leaf stripping means includes a pair of rollers
(b) said rollers being in length from about 2 to about 5 times the diameter of said stalk receiving tube.
43. A leaf stripper for tobacco and the like including:
(a) a support frame having a front and rear
(b) a housing on said support frame
(c) a conveyor associated with the front of said housing
(d) motor means on said support frame
(e) said motor means including a drive shaft
(f) a driven member in said housing on said support frame including a stalk support having an access to the outside of said housing
(g) leaf stripping means mounted on said support frame and extending outside of said housing and beneath said stalk support
(h) said stalk support and said leaf stripping means being positioned above said conveyor
(i) means associated with said driven member for driving said leaf stripping means, and
(j) said leaf stripping means and said driven member having parallel axes.
44. A leaf stripper as in claim 43 and including:

(a) means associated with said driven member for driving said conveyor.

45. A leaf stripper as in claim 43 and including:
(a) stalk in-feed means.

46. A leaf stripper as in claim 45 and including:
(a) means associated with said driven member for driving said stalk in-feed means.

47. A leaf stripper as in claim 43 and including:
(a) stalk chopping means.

48. A leaf stripper as in claim 47 and including:
(a) means associated with said driven member for driving said stalk chopping means.

49. A leaf stripper as in claim 43 and including:
(a) stalk in-feed means
(b) stalk chopping means, and
(c) means associated with said driven member for driving said conveyor, said stalk in-feed means and said stalk chopping means.

50. A leaf stripper as in claim 49 and wherein:
(a) said stalk chopping means and said stalk in-feed means and said means for driving said conveyor are enclosed within said housing.

51. A leaf stripper as in claim 50 and including:
(a) means for discharging said chopped stalk from said housing.

52. A leaf stripper as in claim 43 and wherein:
(a) said driven member is tubular.

53. A leaf stripper as in claim 49 and wherein:
(a) said means associated with said driven member for driving said conveyor, said stalk in-feed means and said stalk chopping means, includes a series of pulleys, endless belts, sprockets and chains.

54. A leaf stripper as in claim 53 and wherein:
(a) said at least some of said series of pulleys, endless belts, sprockets and chains are mounted on said tubular stalk support and are driven thereby.

55. A leaf stripper as in claim 54 and wherein:
(a) said leaf stripping means includes a pair of rollers having conical ends.

56. A leaf stripper as in claim 55 and including:
(a) leaf guide means associated with said rollers.

57. The method of machine stripping leaves from stalk comprising:
(a) pushing said stalk from its rearward end horizontally on a horizontal plane end first along said stalk axis
(b) grabbing said stalk at said pushed forward end while supporting a rearward portion of said stalk and pulling it forward on its stalk axis pushed forward end first
(c) grabbing the leaves on the stalk, and
(d) stripping the leaves angularly from the stalk by a downwardly vertical pull simultaneously with the horizontal movement of the stalk along its axis while maintaining said stalk in its initial horizontal plane.

58. The method of claim 57 and including:
(a) chopping said stripped stalk into pieces beginning at its forward end.

59. The method of claim 58 and including:
(a) chopping said stripped stalk into pieces simultaneously with said stripping of said leaves.

60. The method of claim 57 and wherein:
(a) said stripping of said leaves angularly from said stalk is done sequentially from said forwrd end.

61. The method of claim 57 and wherein:
(a) said forward end of said stalk is the top of said stalk.

62. The method of claim 57 and wherein:
(a) said forward end of said stalk is the bottom of said stalk.

63. The method of claim 57 and including:
(a) applying rearward pressure to a forward portion of the stems of the leaves while applying said downward vertical pull.

64. A leaf stripper for tobacco stalk and the like including:
(a) cooperating leaf stripping means
(b) means for moving said stripping means to form a generally horizontal nip
(c) stalk supporting and in-feeding means mounted adjacent said stripping means and in the area of said nip
(d) said nip having its axis disposed generally in the same direction as the axis of said stalk supporting and infeeding means,
(e) said nip lying entirely below said stalk supporting and in-feeding means
(f) whereby when said stalk is fed into said stalk supporting and in-feeding means, said leaves are engaged by said nip and pulled generally downwardly and angularly from said stalk with respect to the direction of in-feeding.

65. A leaf stripper as in claim 64 and wherein:
(a) said nip is directly below and aligned with said stalk supporting and in-feeding means.

66. A leaf stripper as in claim 1 and including:
(a) chopper means adjacent said rear end for chopping said stalk prior to its delivery to said stalk receiving means.

67. A leaf stripper for tobacco stalks and the like including:
(a) stalk supporting means including front and rear ends
(b) a stalk receiving axially rotatable means opening at said front end
(c) means for moving said stalk into and through the opening of said axially rotatable means
(d) said axially rotatable means including means for aiding in the severing of leaves from said stalk, and
(e) leaf stripping means adjacent said opening for grasping said leaves and removing said leaves from said stalk pulling said leaves in a generally downward direction.

68. A leaf stripper as in claim 67 and wherein:
(a) said stalk supporting means includes a stalk receiving tube.

69. A leaf stripper as in claim 67 and wherein:
(a) said means for aiding in severing said leaves includes an annular cutting edge on said axially rotatable means.

70. A leaf stripper as in claim 67 and wherein:
(a) said means for moving said stalk includes rotatable stalk feed means.

71. A leaf stripper as in claim 70 and wherein:
(a) said rotatable stalk feed means includes a pair of rotatable cooperating feed rollers at said rear end of said stalk supporting means.

72. A leaf stripper as in claim 67 and wherein:
(a) said leaf stripping means lies beneath said front end.

73. A leaf stripper as in claim 67 and including:
(a) means adjacent leaf stripping means for receiving said stripped leaves.

74. A leaf stripper as in claim 67 and including:
(a) means adjacent said rear end of said stalk supporting means for receiving said stripped stalk.

* * * * *